(12) United States Patent
Ni et al.

(10) Patent No.: US 11,722,494 B2
(45) Date of Patent: Aug. 8, 2023

(54) METHOD FOR LIMITING USAGE OF APPLICATION, AND TERMINAL

(71) Applicant: Huawei Technologies Co., Ltd., Shenzhen (CN)

(72) Inventors: Jing Ni, Beijing (CN); Kai Qian, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/128,506

(22) Filed: Dec. 21, 2020

(65) Prior Publication Data

US 2021/0112070 A1 Apr. 15, 2021

Related U.S. Application Data

(63) Continuation of application No. 15/775,260, filed as application No. PCT/CN2016/076989 on Mar. 22, 2016, now Pat. No. 10,972,476.

(51) Int. Cl.
*H04M 11/00* (2006.01)
*H04L 9/40* (2022.01)
(Continued)

(52) U.S. Cl.
CPC ............ *H04L 63/107* (2013.01); *G06F 21/51* (2013.01); *H04M 1/724634* (2022.02);
(Continued)

(58) Field of Classification Search
CPC . H04M 15/00; H04M 1/72463; G06F 3/0481; G06F 3/04817; H04L 63/10; H04L 63/108
See application file for complete search history.

(56) References Cited

U.S. PATENT DOCUMENTS 6,678,824 B1 * 1/2004 Cannon .................. A63F 13/10
726/22
8,571,538 B2 10/2013 Sprigg et al.
(Continued)

FOREIGN PATENT DOCUMENTS

CN 102855062 A 1/2013
CN 103188227 A 7/2013
(Continued)

OTHER PUBLICATIONS

C1-100321, Ericsson et al, "Correction of minor drafting rule issues for TS 27.007," 3GPP TSG-CT WG1 Meeting #63, San Francisco (California), USA, Feb. 22-26, 2010, 59 pages.

*Primary Examiner* — Shantell L Heiber
(74) *Attorney, Agent, or Firm* — Conley Rose, P.C.

(57) ABSTRACT

A method for limiting usage of an application on a mobile terminal includes presetting a usage limitation condition for the application, where the usage limitation condition includes a geographical location, a time, and a network condition of the mobile terminal. When an input operation of a user is received, the method includes obtaining a current operation environment corresponding to the usage limitation condition, limiting usage of the application when the operation environment meets the usage limitation condition, or normally using the application when the operation environment does not meet the usage limitation condition.

20 Claims, 13 Drawing Sheets

(51) Int. Cl.

| | |
|---|---|
| *H04W 48/04* | (2009.01) |
| *G06F 21/51* | (2013.01) |
| *H04N 21/45* | (2011.01) |
| *H04N 21/443* | (2011.01) |
| *H04W 4/021* | (2018.01) |
| *H04M 1/72463* | (2021.01) |
| *H04M 15/00* | (2006.01) |

(52) U.S. Cl.
CPC ........... *H04M 15/58* (2013.01); *H04M 15/83* (2013.01); *H04M 15/88* (2013.01); *H04N 21/4438* (2013.01); *H04N 21/4524* (2013.01); *H04W 4/021* (2013.01); *H04W 48/04* (2013.01)

(56) References Cited

U.S. PATENT DOCUMENTS

| | | | |
|---|---|---|---|
| 9,049,305 B2* | 6/2015 | Carney | H04L 63/10 |
| 9,076,008 B1 | 7/2015 | Moy | |
| 9,137,620 B1* | 9/2015 | Mirza | H04W 4/00 |
| 9,442,709 B1 | 9/2016 | Sprint | |
| 2004/0166878 A1 | 8/2004 | Erskine et al. | |
| 2005/0282559 A1 | 12/2005 | Erskine et al. | |
| 2011/0065375 A1 | 3/2011 | Bradley | |
| 2012/0098867 A1 | 4/2012 | Zheng | |
| 2013/0017806 A1 | 1/2013 | Sprigg et al. | |
| 2013/0040629 A1 | 2/2013 | Sprigg et al. | |
| 2013/0076774 A1 | 3/2013 | Yu et al. | |
| 2013/0080522 A1* | 3/2013 | Ren | H04L 12/6418 709/204 |
| 2013/0222238 A1 | 8/2013 | Sliger | |
| 2013/0305262 A1 | 11/2013 | Nara et al. | |
| 2014/0068522 A1 | 3/2014 | Lim et al. | |
| 2014/0115509 A1 | 4/2014 | Deng et al. | |
| 2014/0136607 A1 | 5/2014 | Ou et al. | |
| 2014/0162595 A1 | 6/2014 | Raleigh et al. | |
| 2014/0273967 A1 | 9/2014 | Kwon et al. | |
| 2015/0056974 A1* | 2/2015 | Kim | H04M 1/72448 455/418 |
| 2015/0079965 A1 | 3/2015 | Mullins | |
| 2015/0199110 A1 | 7/2015 | Nakazato | |
| 2015/0215444 A1 | 7/2015 | Tang et al. | |
| 2015/0237193 A1* | 8/2015 | Zeilingold | H04W 4/021 455/418 |
| 2015/0277533 A1 | 10/2015 | Kim et al. | |
| 2015/0304880 A1 | 10/2015 | Kotecha et al. | |
| 2015/0339469 A1 | 11/2015 | Brown et al. | |
| 2015/0365516 A1* | 12/2015 | Aoyagi | H04M 1/72463 455/418 |
| 2016/0227431 A1 | 8/2016 | Alisawi | |
| 2016/0232336 A1* | 8/2016 | Pitschel | G06F 21/305 |
| 2016/0266672 A1 | 9/2016 | Inagaki et al. | |
| 2016/0314308 A1 | 10/2016 | Suzuki et al. | |
| 2016/0316008 A1 | 10/2016 | Nnishikido et al. | |
| 2016/0349962 A1 | 12/2016 | Chen et al. | |
| 2018/0227286 A1 | 8/2018 | Ohsumi | |
| 2018/0332178 A1 | 11/2018 | Ni et al. | |

FOREIGN PATENT DOCUMENTS

| | | |
|---|---|---|
| CN | 103229182 A | 7/2013 |
| CN | 103313343 A | 9/2013 |
| CN | 103399768 A | 11/2013 |
| CN | 103530551 A | 1/2014 |
| CN | 103607513 A | 2/2014 |
| CN | 103650466 A | 3/2014 |
| CN | 103927475 A | 7/2014 |
| CN | 104038618 A | 9/2014 |
| CN | 104052868 A | 9/2014 |
| CN | 104375851 A | 2/2015 |
| CN | 104516643 A | 4/2015 |
| CN | 104660821 A | 5/2015 |
| CN | 104680058 A | 6/2015 |
| CN | 104715173 A | 6/2015 |
| CN | 104750479 A | 7/2015 |
| CN | 104754140 A | 7/2015 |
| CN | 104935745 A | 9/2015 |
| CN | 105094962 A | 11/2015 |
| CN | 105160239 A | 12/2015 |
| CN | 105302598 A | 2/2016 |
| JP | 2004295180 A | 10/2004 |
| JP | 2009130856 A | 6/2009 |
| JP | 5137150 B1 | 2/2013 |
| JP | 2013065289 A | 4/2013 |
| JP | 2013219474 A | 10/2013 |
| JP | 2013228953 A | 11/2013 |
| JP | 2014529368 A | 11/2014 |
| JP | 2014533383 A | 12/2014 |
| JP | 2015069230 A | 4/2015 |
| JP | 2015127900 A | 7/2015 |
| JP | 2016111546 A | 6/2016 |
| JP | 2019505035 A | 2/2019 |
| JP | 2020149720 A | 9/2020 |
| KR | 20140029816 A | 3/2014 |
| KR | 20160004600 A | 1/2016 |
| WO | 2007005048 A2 | 1/2007 |
| WO | 2008050512 A1 | 5/2008 |
| WO | 2015114806 A1 | 8/2015 |

* cited by examiner

METHOD FOR LIMITING USAGE OF APPLICATION, AND TERMINAL

CROSS-REFERENCE TO RELATED APPLICATIONS

This application is a continuation of U.S. patent application Ser. No. 15/775,260 filed on May 10, 2018, which is a National Stage of International Patent Application No. PCT/CN2016/076989 filed on Mar. 22, 2016. Both of the aforementioned applications are hereby incorporated by reference in their entireties.

TECHNICAL FIELD

The present invention relates to the data processing field, and specifically, to a method for limiting usage of an application, and a terminal.

BACKGROUND

With large-scale popularity of mobile terminals such as a mobile phone, a tablet computer, a handheld device (such as a PDA (personal digital assistant) and an MP4 player), and a wearable device (such as a smart band, a smartwatch, and smart glasses) having a mobile communication function, people's life becomes more convenient. Especially, diverse applications (also referred to as an APP, Application) on a mobile terminal make life funny. However, a user may be indulged, and therefore normal working and learning are affected, and adverse impact such as "mobile phone dependence" is generated. Therefore, usage of an application needs to be limited.

In the prior art, a visitor mode or a child mode may be set on an operating system layer of a mobile terminal, so that some applications are invisible and therefore cannot be used in this mode. However, the inventor finds that this limitation is of a single form and not flexible enough, and a capability of human-computer interaction between the mobile terminal and a user is impaired. Therefore, the mobile terminal processes a transaction with quite low efficiency. At a layer of a single application, a "study mode" may be set, that is, a user is prohibited from exiting from the application in a period of time. Forms of the two methods are single, and therefore, diverse management of applications cannot be implemented.

SUMMARY

In view of this, embodiments of the present invention provide a method for limiting usage of an application, and a terminal, to overcome a prior-art management deficiency in application usage of a mobile terminal, and provide diverse and personalized application management methods for a user.

According to a first aspect, an embodiment of the present invention provides a method for limiting usage of an application. The method includes: presetting a usage limitation condition for the application, where the usage limitation condition includes a time, a geographical location, a network condition, and a user attribute of the mobile terminal; when an input operation of a user is received, obtaining a current operation environment corresponding to the usage limitation condition; and limiting usage of the application when the operation environment meets the usage limitation condition; or normally using the application when the operation environment does not meet the usage limitation condition.

The usage limitation condition is specifically some conditions that are set so that the mobile terminal performs particular processing for execution of the application in some special cases. The application usage limitation condition includes but is not limited to the time, the geographical location, the user attribute, and the network condition for limiting usage of the application, and these conditions may be randomly combined. The usage limitation condition is a user-specified application usage limitation condition and/or a system default application usage limitation condition of the mobile terminal. When the user-specified usage limitation condition conflicts with the system default usage limitation condition, that is, when both the user and a system perform setting on a same usage limitation condition, the user-specified condition takes precedence. The user may directly perform a setting operation on the application. For example, the user performs a setting operation on an icon of the application on a display screen of the mobile terminal. Alternatively, the user may perform a setting operation on an independent setting interface. For example, the user limits application usage conditions individually or in batches on a setting interface including an application list. The system default limitation condition of the mobile terminal includes a default limitation condition at delivery and/or a limitation condition that is set by analyzing a user operation habit. The user operation habit includes a frequency of use, a time of use, a geographical location of use, a network condition of use, a user identity of use, and the like. The mobile terminal analyzes the user operation habit by means of statistics collection, to obtain a rule of using an application or some applications by the user, and then set an application usage limitation condition.

With reference to the first aspect, in a first implementation of the first aspect, if the usage limitation condition includes the geographical location and the time of the mobile terminal, the obtaining a current operation environment corresponding to the usage limitation condition specifically includes: obtaining a geographical location of the mobile terminal by using a positioning module of the mobile terminal; and obtaining a system time of the mobile terminal by calling a function.

With reference to the first aspect and the first implementation of the first aspect, in a second implementation of the first aspect, the limiting usage of the application when the operation environment meets the usage limitation condition is specifically: limiting usage of the application when the obtained geographical location and the obtained system time are consistent with the geographical location and the time in the usage limitation condition.

With reference to the first aspect, in a third implementation of the first aspect, if the usage limitation condition includes the time and the network condition of the mobile terminal, the obtaining a current operation environment corresponding to the usage limitation condition specifically includes: obtaining a system time and a network condition of the mobile terminal by calling a function.

With reference to the first aspect and the third implementation of the first aspect, in a fourth implementation of the first aspect, the limiting usage of the application when the operation environment meets the usage limitation condition is specifically: limiting usage of the application when the obtained system time and the obtained network condition are consistent with the time and the network condition in the usage limitation condition.

With reference to the first aspect, in a fifth implementation of the first aspect, a quantity of applications to which the application usage limitation condition is specific is not limited, and one or one type of application or all applications are included. That is, a usage limitation condition may be set for a single application, or a usage limitation condition may be set for a plurality of applications. A type of application is a plurality of applications having similar attributes such as a source, a purpose, an identifier, and a user usage habit. Common application types are, for example, a system application type, a learning and working type, an entertainment type, and a social contact type. A classification rule is preset at delivery of a device, user-specified, updated by using a network, or set by using a combination thereof. The classification rule may be started by default, started by means of regular (for example, periodic) or irregular (for example, random) triggering by the user, started by means of triggering by using a network instruction, or started by using a combination thereof.

With reference to the first aspect, in a sixth implementation of the first aspect, the limiting usage of the application includes but is not limited to: (1) not temporarily performing an operation of starting the application, that is, receiving a user touch operation but not immediately starting the application, including delaying starting or prohibiting starting of the application; (2) prohibiting a system notification of the application, that is, not popping up a message notification of the application during usage limitation of the application. The delaying starting is not temporarily performing, when an operation of starting the application for the first time by the user is detected, the operation of starting the application, but performing the operation of starting the application after a specific condition is met.

With reference to the first aspect and the sixth implementation of the first aspect, in a seventh implementation of the first aspect, the prohibiting starting of the application further includes at least one of the following manners: locking the application for a period of time, hiding the icon of the application, changing a location of the icon of the application, starting the application only after touching and holding or heavily pressing the icon of the application is received, starting the application only after tapping the icon of the application for at least two times is received, disappearing by the icon after tapping the icon of the application for at least two times is received, uninstalling the application after tapping the icon of the application for at least two times is received, dimming or turning off a screen after tapping the icon of the application for at least two times is received, or locking/powering off/restarting the mobile terminal after tapping the icon of the application for at least two times is received.

With reference to the first aspect and the sixth implementation of the first aspect, in an eighth implementation of the first aspect, the delaying starting of the application further includes at least one of the following manners: locking the application for a period of time, hiding the icon of the application, changing a location of the icon of the application, starting the application only after touching and holding or heavily pressing the icon of the application is received, starting the application only after tapping the icon of the application for at least two times is received, disappearing by the icon after tapping the icon of the application for at least two times is received, uninstalling the application after tapping the icon of the application for at least two times is received, dimming or turning off a screen after tapping the icon of the application for at least two times is received, or locking/powering off/restarting the mobile terminal after tapping the icon of the application for at least two times is received.

With reference to the first aspect, in a ninth implementation of the first aspect, a display state of the icon of the application whose usage is limited is different from a normal display state, for example, the icon deforms, the icon discolors, a limitation mark (for example, a locking mark) is added, the icon disappears, or the icon is moved to a specific location. After the usage limitation condition is removed, that is, the usage limitation condition is not met, the icon of the application is restored to the normal display state.

According to a second aspect, an embodiment of the present invention provides a terminal, including: a touchscreen, one or more processors, a memory, and one or more programs. The one or more programs are stored in the memory and are configured to be executed by the one or more processors. The one or more programs include an instruction. The instruction is used to perform the following operations: presetting a usage limitation condition for the application, where the usage limitation condition includes a time, a geographical location, a network condition, and a user attribute of the mobile terminal; when an input operation of a user is received, obtaining a current operation environment corresponding to the usage limitation condition; and limiting usage of the application when the operation environment meets the usage limitation condition; or normally using the application when the operation environment does not meet the usage limitation condition. A specific method is the same as the method in the first aspect.

In a possible implementation, optionally, the terminal may further include one or more of the following components: a GPS module, an RF circuit, a WiFi module, a loudspeaker, a microphone, a sensor, a power supply, a camera, or a Bluetooth module.

According to a third aspect, an embodiment of the present invention provides a mobile terminal for limiting usage of an application, including: a detection unit, a determining unit, a storage unit, and an execution unit; when detecting an input operation of a user, the detection unit obtains a current operation environment corresponding to the usage limitation condition, and sends a condition of the operation environment to the determining unit; the determining unit compares the received condition of the operation environment with the preset usage limitation condition stored in the storage unit; and when the operation environment meets the usage limitation condition, the determining unit sends an execution instruction for limiting usage to the execution unit, and the execution unit limits usage of the application according to the execution instruction received from the determining unit; or when the operation environment does not meet the usage limitation condition, the determining unit sends an execution instruction for not limiting usage to the execution unit, and the execution unit does not limit usage of the application.

According to a fourth aspect, an embodiment of the present invention provides a storage medium, configured to store a computer software instruction used to implement the method in the first aspect.

In the foregoing solutions, the embodiments of the present invention provide flexible and diverse application management policies for the user of the mobile terminal, so that a single-form and inflexible disadvantage in the prior art is overcome, a self-control ability of the user is improved, a better user usage habit is developed, and the user is prevented from relying on or even being addicted to the mobile terminal. Therefore, this is of great social significance.

DESCRIPTION OF EMBODIMENTS

Figure 1:
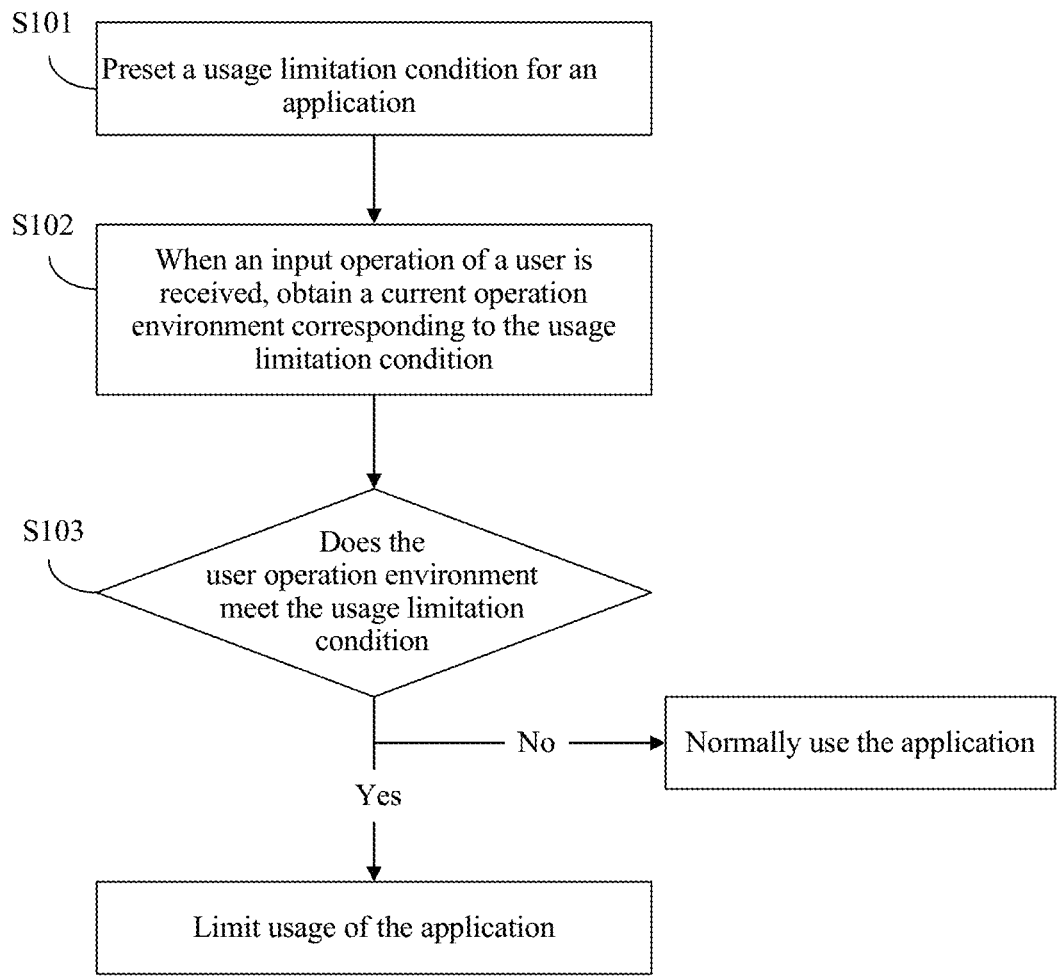
FIG. 1 is a flowchart of a method for limiting usage of an application on a mobile terminal according to an embodiment of the present invention.

The technical solutions in embodiments of the present invention are clearly described in detail below with reference to the accompanying drawings of the embodiments.

A mobile terminal described in the embodiments of the present invention includes but is not limited to a mobile phone, a tablet computer, a handheld device (such as a PDA (personal digital assistant) and an MP4 player), and a wearable device (such as a smart band, a smartwatch, and smart glasses) having a mobile communication function, and an operating system installed on the mobile terminal includes but is not limited to iOS®, Android®, Microsoft®, DOS, Unix, Linux, or another operating system. The mobile terminal in the embodiments of the present invention includes a touchscreen, a display controller, a graphical user interface, one or more processors, a memory, and one or more modules, programs, or instruction sets stored in the memory that are configured to perform a plurality of functions. Optionally, in some embodiments, the mobile terminal further includes one or more of the following components: a GPS module, an RF circuit, a WiFi module, a loudspeaker, a microphone, a sensor, a power supply, a camera, or a Bluetooth module. The graphical user interface (Graphical User Interface, GUI for short) is a computer operation user interface displayed in a graphical manner. The GPS module determines a geographical location of the mobile terminal, and provides the information so that the information can be used in various applications. It should be understood that the GPS module in this specification is configured to determine a geographical location, and therefore may be replaced with another positioning system, for example, GLONASS, Galileo, or the BeiDou Navigation Satellite System.

A touch operation may be completed by touching a touchscreen by using a proper part or object such as a finger or a stylus. The touchscreen includes a touch-sensitive surface (touch-sensitive surface) and a display (display). The touch-sensitive surface is configured to perform various operations related to touch detection, for example, to determine whether there is a touch (for example, to detect a finger pressing event), to determine whether there is touch movement and track the movement on the entire touch-sensitive surface (for example, to detect a one-or-more finger dragging event), and to determine whether a touch ends (for example, to detect a finger release or touch interruption event). Determining movement of a touch point may include: determining a rate (value), a velocity (value and direction), and/or acceleration (change of the value and/or the direction) of the touch point, and the movement of the touch point is indicated by a series of touch data. These operations may be applied to a single-point touch (for example, a one-finger touch) or a multi-point simultaneous touch (for example, a "multi-point touch"/a multi-finger touch).

The display controller receives and/or sends an electrical signal from/to the touchscreen. The display displays visual output to a user, and the visual output includes a text, a graph, an icon, a video, and any combination thereof. In some embodiments, some visual output or all visual output may be corresponding to user interface objects. An LCD (liquid crystal display) technology or an LPD (laser phosphor display) technology or another display technology may be used for the display. A touch detection technology includes but is not limited to a capacitive technology, a resistive technology, an infrared technology, and a surface acoustic wave technology. It should be noted that the touchscreen should be understood as a touch input device in a broad sense. The touch-sensitive surface may be integrated with the display, or may be separately disposed as an independent touch input device to connect to a system. For example, coordination between mouse movement and a mouse press (with or without pressing or holding one or more keyboards), user movement, gentle tapping, dragging, rolling, and the like on a touch panel, stylus input, device movement, a verbal instruction, detected eye movement, biometric feature input, and/or any combination thereof may be used as touch input devices. Although reference is mainly made to finger input (for example, a single-finger touch, a single-finger gentle tap gesture, and a single-finger flick gesture) in the following embodiments, it should be understood that, in some embodiments, one or more of the finger input may be replaced with input (for example, stylus input) from another touch input device.

In this specification, unless otherwise specified, a user gesture is flexible, and may be tapping, double tapping, circle drawing, line drawing, single-finger touching, multi-finger touching, or the like. A person of ordinary skill in the art may understand that, a specific gesture may be flexibly selected as long as basically same effects can be achieved. In this specification, unless otherwise specified, a user gesture flexibly acts on a position or an area on the touch-sensitive surface, and may act on or near an area of an application interface element displayed on the display, on a vacant area in which no application interface element is displayed on the display, on an area of function setting displayed on the display, and the like. A person of ordinary skill in the art may understand that, a specific position or area that is of the touch-sensitive surface and on which a gesture acts may be flexibly set as long as basically same effects can be achieved.

A mobile terminal device generally supports a plurality of applications, such as one or more of the following applications: a drawing application, a presentation application, a word processing application, a web page creation application, a disk editing application, a spreadsheet application, a game application, a phone application, a video conference application, an email application, an instant message application, an exercise support application, a photograph management application, a digital camera application, a digital video camera application, a network browsing application, a digital music player application, or a digital video player application.

Various applications that can be executed on the device may use at least one common physical user interface device, such as a touch-sensitive surface. One or more functions of the touch-sensitive surface and corresponding information displayed on the device may be adjusted and/or changed from an application to a next application and/or may be adjusted and/or changed in a corresponding application. In this way, a common physical architecture (for example, a touch-sensitive surface) of the device can support various applications by using a user interface that is intuitive and clear to a user.

Referring to FIG. 1, an embodiment of the present invention provides a method for limiting usage of an application on a mobile terminal. The method specifically includes the following steps.

S101. The mobile terminal presets a usage limitation condition for the application, where the usage limitation condition includes a geographical location, a time, a user attribute, and a network condition of the mobile terminal.

In this embodiment of the present invention, presetting may be setting the usage limitation condition for the application by the mobile terminal according to received user input, or may be default setting of the mobile terminal. This is not limited in this embodiment of the present invention.

The usage limitation condition is specifically some conditions that are set so that the mobile terminal performs particular processing for execution of the application in some special cases. The application usage limitation condition includes but is not limited to the time, the geographical location, the user attribute, and the network condition for limiting usage of the application. These conditions may be randomly combined, that is, the preset usage limitation condition includes at least one of the following conditions: the time, the geographical location, the user attribute, or the network condition. Specific examples of the usage limitation condition are: (1) the time; (2) the geographical location; (3) the user attribute; (4) the network condition; (5) the time and the geographical location; (6) the time and the user attribute; (7) the time and the network condition; (8) the geographical location and the user attribute; (9) the geographical location and the network condition; (10) the user attribute and the network condition; (11) the time, the geographical location, and the user attribute; (12) the time, the geographical location, and the network condition; (13) the time, the user attribute, and the network condition; (14) the geographical location, the user attribute, and the network condition; (15) the time, the geographical location, the user attribute, and the network condition.

The system default limitation condition of the mobile terminal includes a default limitation condition at delivery and/or a limitation condition that is set by analyzing a user operation habit. The user operation habit includes a frequency of use, a time of use, a geographical location of use, a network condition of use, a user identity of use, and the like. The mobile terminal analyzes the user operation habit by means of statistics collection by using a component such as a processor, to obtain a rule of using an application or some applications by a user, and then set an application usage limitation condition. For example, usage of a call application may be limited during a sleep time according to a timetable in which an alarm is set by the user, to avoid interference from a phone ringtone.

S102. When an input operation of a user is received, obtain a current operation environment corresponding to the usage limitation condition.

The input operation of the user is an operation of sending an instruction to the mobile terminal by the user by using an input device, and includes voice input, image input, key input, touch input, and the like, and may specifically include operations, for example, unlocking the mobile terminal, lighting up a screen, touching a key, touching the screen, tapping an icon of an application, and sending an instruction by using physiological features such as voice recognition, facial recognition, and fingerprint recognition. It should be particularly noted that although tapping an icon of an application is used as an example in some embodiments of the present invention, another input operation should also be included. For example, when the user unlocks the mobile terminal, or presses a Home key of the mobile phone to light up the screen when crossing a road, this method may also be used to determine whether the application can be normally used.

Obtaining the current operation environment corresponding to the usage limitation condition is obtaining an application usage limitation condition of a system when the mobile terminal detects the input operation of the user, and obtaining, according to the usage limitation condition, a corresponding condition when the input operation of the user is received. For example, if the application usage limitation condition is a time and a geographical location when the system receives the input operation of the user, conditions of a time and a geographical location of the current user input operation environment are obtained.

The time, the network condition, and the user attribute may be learned by calling a system function, and the geographical location may be obtained by using a GPS positioning module.

S103. Limit usage of the application when the operation environment meets the usage limitation condition; or normally use the application when the operation environment does not meet the usage limitation condition.

The processor compares conditions in the usage limitation condition with corresponding conditions of the user input operation environment one by one. If all the conditions of the user input operation environment meet requirements of corresponding usage limitation conditions, the user input operation environment meets the usage limitation condition, and usage of the application is limited. If one or more conditions do not meet requirements, the user input operation condition does not meet the usage limitation condition, and the application is normally used. For example, for an application, there are two usage limitation conditions: a time and a geographical location, a time condition is 8:00-10:00, and a geographical location condition is home. However, when the user performs a touch operation, a time corresponding to an operation environment is 9:30, and a geographical location condition is school. It may be learned, after comparison, that a time condition of the user operation meets a requirement, but the geographical location condition does not meet a requirement, and therefore, the application is normally used.

When the user-specified usage limitation condition conflicts with the system default usage limitation condition, that is, when both the user and the system perform setting on a same usage limitation condition, a user-specified condition takes precedence. For example, usage of an application is limited in a WiFi network condition by means of system default, but a condition that is set for the same application by the user is that usage of the application is not limited in the WiFi network condition. When a user touch operation is detected and a network condition is WiFi, comparison is performed according to the user-specified condition, and usage of the application is not limited, that is, the application is normally used after the user touch operation.

It may be understood that, S103 is originally intended to determine whether the application can be normally used in the current operation environment, and therefore, a determining condition is flexibly described. For example, S103 may be described as "when the operation environment does not meet a normal usage condition, limit usage of the application; or when the operation environment meets the normal usage condition, normally use the application", or a similar description. Essence thereof is the same.

Figure 2:
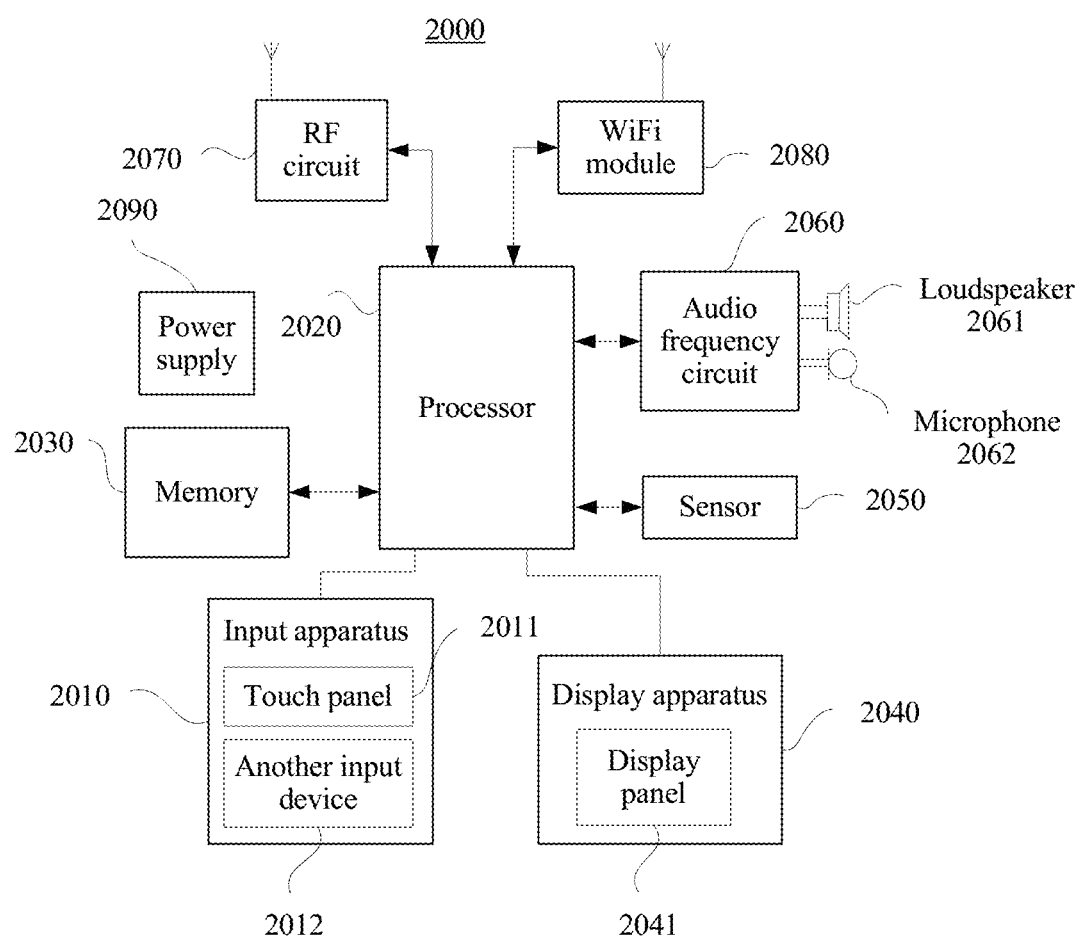
FIG. 2 is a schematic hardware diagram of a mobile terminal according to an embodiment of the present invention.

FIG. 2 is a schematic hardware diagram of a mobile terminal.

The following specifically describes each constituent component of the mobile terminal 2000 with reference to FIG. 2 by using a mobile phone as an example. It should be understood that the mobile terminal 2000 is merely an example of a mobile terminal, and the mobile terminal 2000 may include components more or less than components shown in the figure, and may include a combination of two or more components, or include components differently configured or disposed. Various components shown in FIG. 2 may be implemented in a hardware manner or a software manner or a combination thereof, and include one or more signal processors and/or application-specific integrated circuits.

An input unit 2010 may be configured to: receive input number or character information, and generate key signal input related to user setting and function control of the mobile terminal 2000. Specifically, the input unit 2010 may include a touch panel 2011 and another input device 2012. The touch panel 2011, which is also referred to as a touchscreen, can collect a touch operation (for example, an operation of a user on the touch panel 2011 or near the touch panel 2011 by using any proper object or accessory such as a finger or a stylus) of the user on or near the touch panel 2011, and drive a corresponding connection apparatus according to a preset program. Optionally, the touch panel 2011 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to a processor 2020, and can receive and execute a command sent by the processor 2020. In addition, the touch panel 2011 is implemented by using a plurality of types, such as a resistive type, a capacitive type, an infrared ray, and a surface acoustic wave. The input unit 2010 includes the another input device 2012 in addition to the touch panel 2011. Specifically, the another input device 2012 includes but is not limited to one or more of a physical keyboard, a function key (such as a volume control key or an on/off key), a trackball, a mouse, or a joystick.

A memory 2030 may be configured to store a software program and a module, and the processor 2020 performs various function applications of the mobile terminal 2000 and data processing by running the software program and the module stored in the memory 2030. The memory 2030 may mainly include a program storage area and a data storage area. The program storage area may store an operating system, an application required by at least one function (such as a sound playing function or an image playing function), and the like; and the data storage area may store data (such as audio data or an address book) created according to use of the mobile terminal 2000, and the like. In addition, the memory 2030 includes a high-speed random access memory, and further includes a nonvolatile memory such as at least one magnetic disk storage component, a flash memory component, or another volatile solid-state storage component.

A display unit 2040 may be configured to display information entered by the user or information provided for the user, and various menus of the mobile terminal 2000. The display unit 2040 may include a display panel 2041. Optionally, the display panel 2041 may be configured by using an LCD (Liquid Crystal Display, liquid crystal display), an OLED (Organic Light-Emitting Diode, organic light-emitting diode), or the like. Further, the touch panel 2011 may cover the display panel 2041. When detecting a touch operation on or near the touch panel 2011, the touch panel 2011 transmits the touch operation to the processor 2020 to determine a type of a touch event, and then the processor 2020 provides corresponding visual output on the display panel 2041 according to the type of the touch event. In FIG. 2, the touch panel 2011 and the display panel 2041 are used as two independent components to implement input and output functions of the mobile terminal 2000. However, in some embodiments, the touch panel 2011 and the display panel 2041 are integrated to implement the input and output functions of the mobile terminal 2000.

Optionally, an RF circuit 2070 may be configured to: receive and send information, or receive and send a signal in a call process; particularly, after receiving downlink information of a base station, send the downlink information to the processor 2020 for processing; and in addition, send related uplink data to the base station. Generally, the RF circuit includes but is not limited to an antenna, at least one amplifier, a transceiver, a coupler, an LNA (Low Noise Amplifier, low noise amplifier), or a duplexer. In addition, the RF circuit 2070 further communicates with a network and another device by means of wireless communication. Any communications standard or protocol is used for the wireless communication, including but not limited to GSM (Global System for Mobile Communications), GPRS (general packet radio service), CDMA (Code Division Multiple Access), WCDMA (Wideband Code Division Multiple Access), LTE (Long Term Evolution), email, or SMS (short message service).

Optionally, the mobile terminal 2000 may further include a sensor 2050, such as a light sensor, a motion sensor, and another sensor. Specifically, the light sensor may include an ambient light sensor and a proximity sensor. The ambient light sensor may adjust luminance of the display panel 2041 according to brightness of ambient light, and when the mobile terminal 2000 moves to an ear, the proximity sensor may turn off the display panel 2041 and/or backlight. As a motion sensor, an accelerometer sensor may detect an acceleration value in each direction (usually on three axes), and detect a value and a direction of gravity when the accelerometer sensor is static, and may be used for an application for recognizing a mobile phone posture (for example, landscape/portrait switching, a related game, and magnetometer posture calibration), a function related to vibration recognition (such as a pedometer or a knock), and the like. Optionally, for other sensors such as a gyroscope, a barometer, a hygrometer, a thermometer, and an infrared sensor that may also be disposed on the mobile terminal 2000, details are not described herein.

Optionally, an audio frequency circuit 2060, a loudspeaker 2061, and a microphone 2062 may provide an audio interface between the user and the mobile terminal 2000. The audio frequency circuit 2060 may transmit, to the loudspeaker 2061, an electrical signal converted from received audio data, and the loudspeaker 2061 converts the electrical signal into a sound signal for output. In addition, the microphone 2062 converts a collected sound signal into an electrical signal, the audio frequency circuit 2060 converts the electrical signal into audio data upon receipt of the electrical signal and outputs the audio data to the processor 2020 for processing, and then the processor 2020 sends the audio data to, for example, another mobile phone by using the RF circuit 2070, or outputs the audio data to the memory 2030 for further processing.

Optionally, the mobile terminal 2000 may further include a camera, a Bluetooth module, and the like although they are not shown, and details are not described herein.

Figure 3:
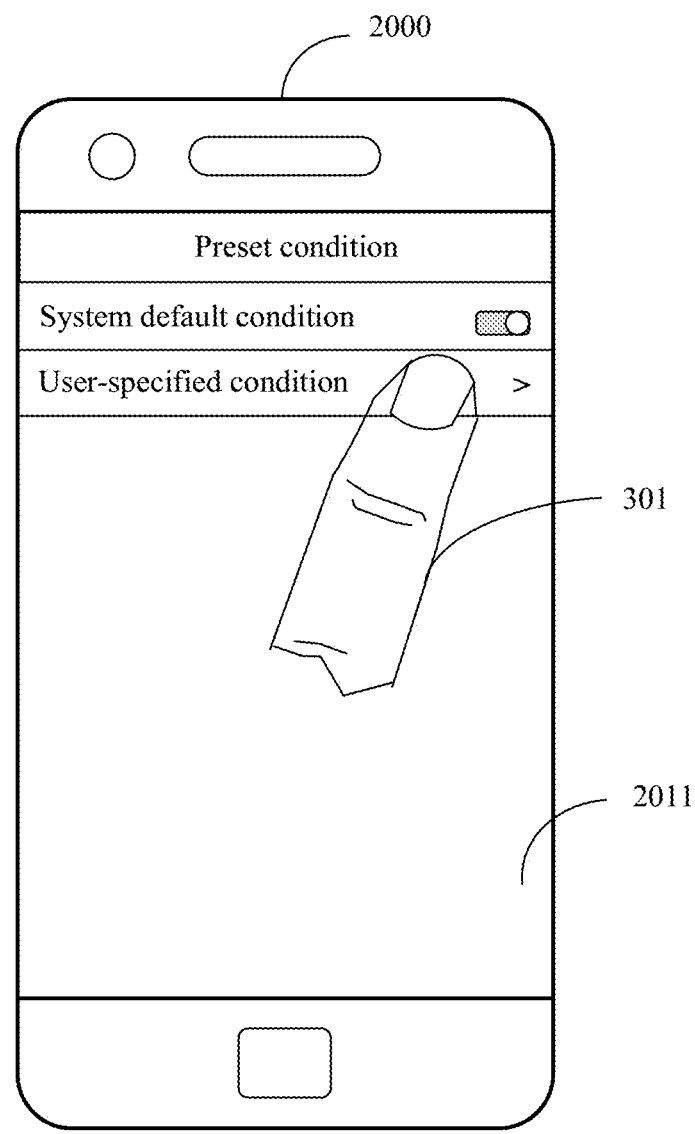
FIG. 3 is a schematic diagram of selecting a preset condition by a user according to an embodiment of the present invention.

Referring to FIG. 3, FIG. 3 is a schematic diagram of selecting a preset usage limitation condition by a user on a mobile terminal 2000 according to user input. A user finger 301 taps a touch panel 2011 for selection. A system default condition of the mobile terminal may be enabled or disabled, and personalized and user-defined setting may be performed on a usage limitation condition by tapping a user-specified condition column. When the system default condition is enabled, and the user also performs personalized setting on the usage limitation condition, a priority of a user-specified condition is higher. That is, if a system default condition conflicts with a user-specified condition for a same user operation condition, the mobile terminal 2000 compares the user operation condition with the personalized user-specified condition to determine whether to limit usage of an application. For example, for an application, a time condition is 8:00-9:00 and a geographical location condition is school in a system default usage limitation condition, a time condition is 8:00-9:00 and a geographical location condition is home in a user-specified usage limitation condition, and the two types of conditions conflict with each other. When the user taps an icon of the application by means of touching, a user input operation environment condition is compared with the user-specified usage limitation condition to determine whether to limit usage of the application.

The preset usage limitation condition is stored in a memory of the mobile terminal for comparison with the user operation condition. When the user operation condition meets the preset usage limitation condition, usage of the application is limited; otherwise, the application is started. Limiting usage of the application is not temporarily performing an operation of starting the application, that is, receiving a user touch operation but not immediately starting the application, including but not limited to: (1) not temporarily performing an operation of starting the application, that is, receiving a user touch operation but not immediately starting the application, including delaying starting or prohibiting starting of the application; (2) prohibiting a system notification of the application, that is, not popping up a message notification of the application during usage limitation of the application. The delaying starting is not temporarily performing, when an operation of starting the application for the first time by the user is detected, the operation of starting the application, but performing the operation of starting the application after a specific condition is met. The delaying starting is starting the application after the specific condition is met, for example, starting the application after a 10-second wait, or starting the application after it is detected that the user consecutively taps an icon of the application for five times, or starting the application after it is detected that the user drags the icon of the application along a predetermined track. For another example, the preset usage limitation condition is limiting usage of an application in a WiFi network condition. If the mobile terminal detects a touch operation of starting the application by the user, and a network condition is WiFi, the mobile terminal limits usage of the application, that is, the mobile terminal does not temporarily perform an operation of starting the application.

It should be noted that a quantity of applications to which the application usage limitation condition is specific is not limited, and one or one type of application or all applications are included. That is, usage of a single application may be limited, or usage of applications may be limited in batches. That is, a same usage limitation condition is set for a type of application or all applications.

A type of application is a plurality of applications having similar attributes such as a source, a purpose, an identifier, and a user usage habit. Common application types are, for example, a system application type, a learning and working type, an entertainment type, and a social contact type. A rule of determining whether applications are applications of a same type, or in other words, a rule of classifying applications is flexible. A classification rule may be preset at delivery of a device, user-specified, updated by using a network, or set by using a combination thereof. The classification rule may be started by default, started by means of regular (for example, periodic) or irregular (for example, random) triggering by the user, started by means of triggering by using a network instruction, or started by using a combination thereof. Applications of a same type include but are not limited to any one or a combination of the following: applications with same or similar sources (for example, two applications are applications preinstalled at delivery, two applications are applications downloaded from a same app store or a same type of app store, or two applications are applications developed by a same developer or a same type of developer); applications with same or similar purposes (for example, two applications are video applications, two applications are fitness applications, or two applications are finance applications); applications with same or similar type identifiers (for example, two applications are identified as game applications, applications downloaded most frequently, applications downloaded most frequently in a specific period of time, or applications downloaded most frequently in a specific area in an app store); or applications with same or similar user usage habits (for example, two applications are applications of which a quantity of user usage times falls within a range (for example, used for more than 1000 times), two applications are applications that are used or frequently used by the user in a period of time (for example, used for more than 50 times in a latest month), two applications are applications used or frequently used by the user in an area, or two applications are applications accessed by the user by using same registration information).

When setting the application usage limitation condition, the user may directly perform a setting operation on the application. For example, the user directly performs an operation on an icon of the application on a display screen of the mobile terminal. Alternatively, the user may perform a setting operation on an independent setting interface. For example, the user limits application usage conditions individually or in batches on a setting interface including an application list. It should be noted that there may be diverse manners of directly performing an operation on an icon of an application provided that a setting option for limiting usage of the application can pop up, and operation actions are touching and holding the icon, double-tapping the icon, performing sliding in various directions (including directions such as up, down, left, and right), dragging, shaking, smearing, box selection, and the like.

Figure 4:
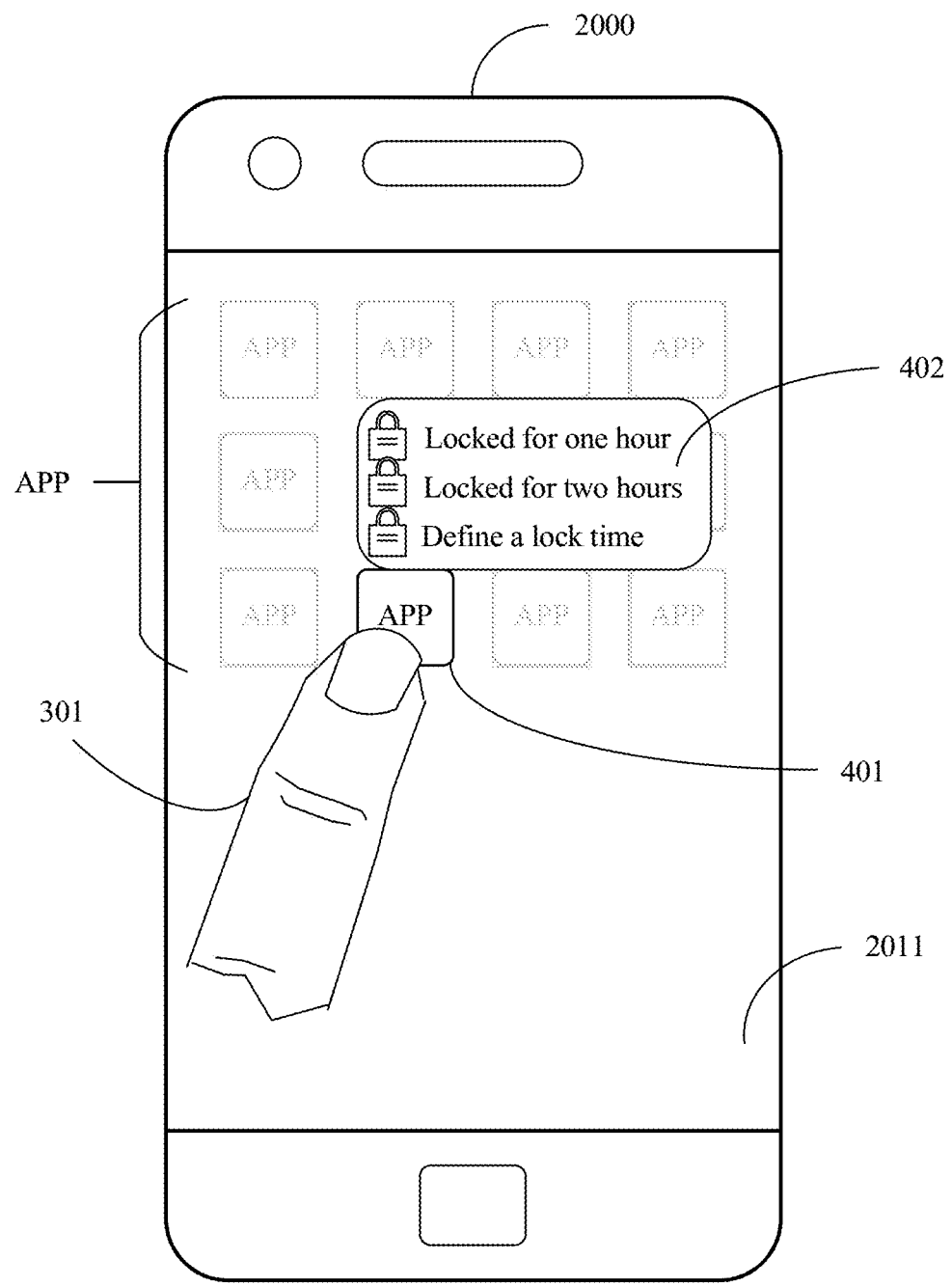
FIG. 4 is a schematic diagram of a direct desktop setting manner in user-defined setting according to an embodiment of the present invention.

Referring to FIG. 4, a mobile terminal 2000 includes a touchscreen 2011, and there are some applications (APP) on a display screen of the mobile terminal 2000. A user finger 301 may perform a touch operation for setting a usage limitation condition for a specific app shown as an app 401 in the figure. In an example of touching and holding an icon, after the user finger 301 touches and holds an icon of the app 401, a setting option 402 pops up, and some usage limitation options, for example, "locked for one hour", "locked for two hours", and "define a lock time" are displayed. The user finger 301 may tap a corresponding option for setting, so that a usage limitation condition is set for the app 401, that is, the app 401 is locked and cannot be used in a period of time.

Figure 5A:
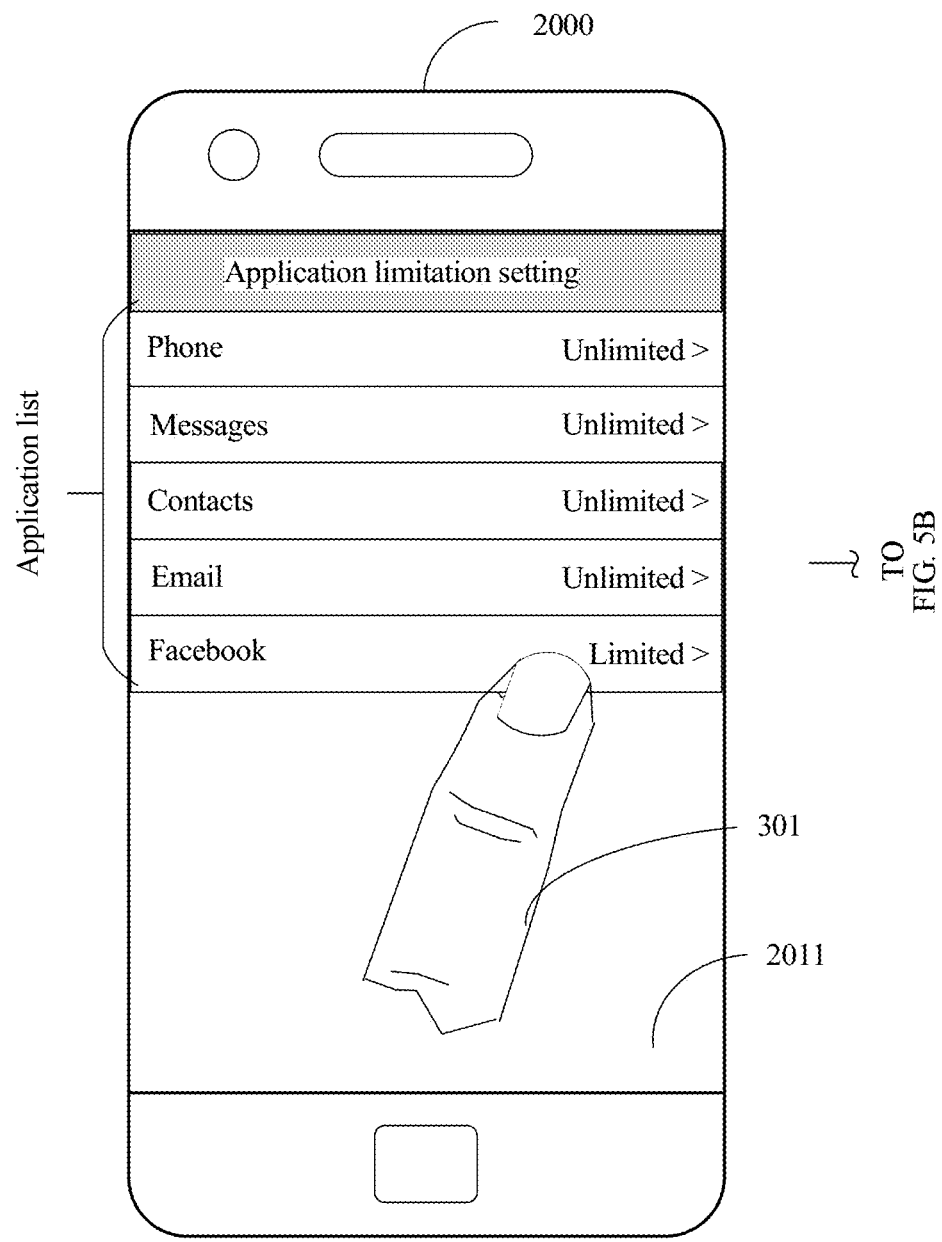
FIG. 5A and FIG. 5B are a schematic diagram of an independent interface setting manner in user-defined setting according to an embodiment of the present invention.
Figure 5B:
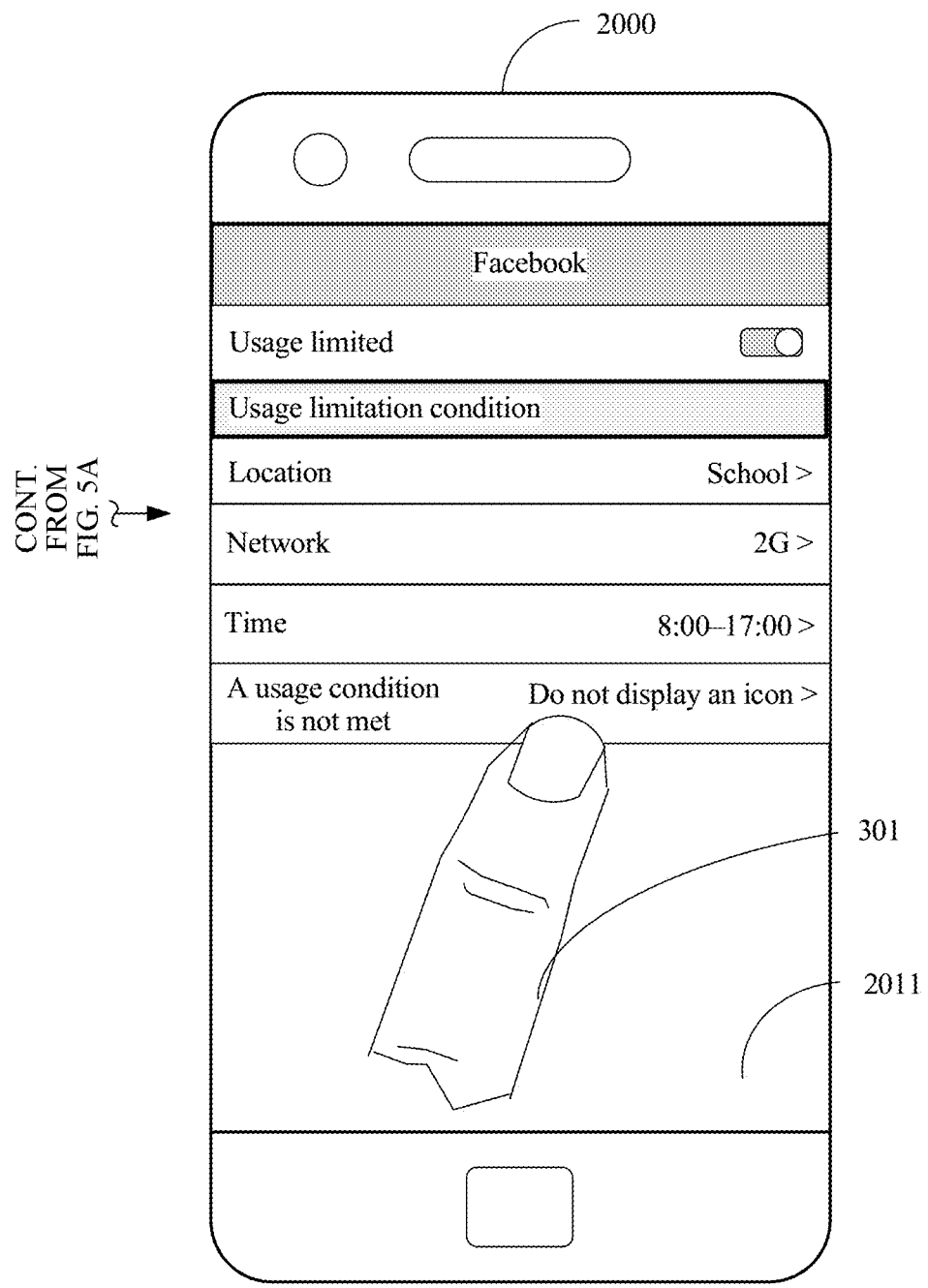

Referring to FIG. 5A and FIG. 5B, a mobile terminal 2000 includes a touchscreen 2011 and an independent setting interface for limiting usage of an application. All applications on the mobile terminal 2000 are displayed in an application list. For each application, a user finger 301 may tap a corresponding application setting option to perform a usage limitation setting operation. In an example of FIG. 5A and FIG. 5B, after tapping a setting option of Facebook, the user finger 301 may set a usage limitation condition for Facebook according to, for example, a location, a network condition, a time, or the like. Setting may be further performed on one type of application in batches although this is not shown in the figure. Details are not described herein.

Optionally, another response manner may be added for limiting usage of an application. The another response manner refers to a feedback that a mobile terminal system gives to a user when the mobile terminal system does not start the limited application, feedback manners are hardly exhaustive, and some typical manners include but are not limited to: locking the application for a period of time, hiding an icon of the application, changing a location of the icon of the application, starting the application only after touching and holding or heavily pressing the icon of the application is received, starting the application only after tapping the icon of the application for at least two times is received, disappearing by the icon after tapping the icon of the application for at least two times is received, uninstalling the application after tapping the icon of the application for at least two times is received, dimming or turning off a screen after tapping the icon of the application for at least two times is received, and locking/powering off/restarting the mobile terminal after tapping the icon of the application for at least two times is received. Tapping for at least two times herein is consecutively tapping for a plurality of times in a period of time. A specific length of the period of time depends on setting of the mobile terminal system. Touching and holding is not immediately leaving the screen and keeping touching for a period of time after the screen is tapped, for example, pressing for three seconds or five seconds. Heavy pressing is tapping the screen by using a force greater than a specified threshold. Further, a system prompt may be provided. These feedback manners may be used in combination or used repeatedly until the usage limitation condition is removed, that is, execution of these feedback manners is terminated after the usage limitation condition is not met. If starting is delayed, an operation of starting an application is performed after execution of the feedback manner is terminated. If starting is prohibited, usage of the application is still prohibited after execution of the feedback manner is terminated.

Figure 6:
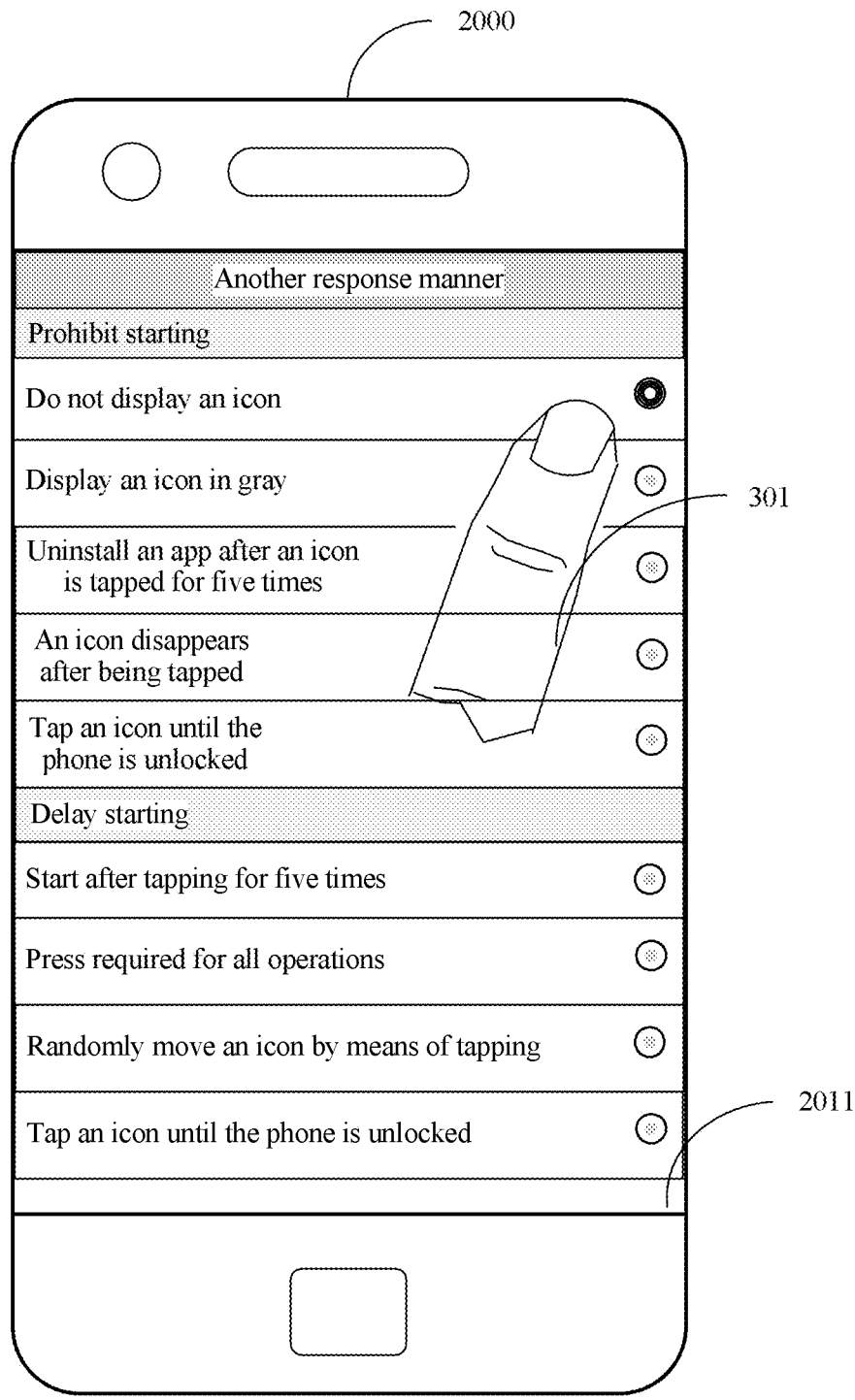
FIG. 6 is a schematic diagram of selecting another response manner for usage limitation according to an embodiment of the present invention.

Referring to FIG. 6, a mobile terminal 2000 includes a touchscreen 2011 configured to display an interface for selecting another response manner. The another response manner may be added after an option of prohibiting starting or an option of delaying starting, and a user finger 301 may select a corresponding response manner by means of tapping. For example, in the figure, a response manner added for prohibiting starting includes: not displaying an icon, displaying an icon in gray, uninstalling an app after an icon is consecutively tapped for five times, disappearing by the icon after tapping, and tapping an icon until the terminal is unlocked; a response manner added for delaying starting includes starting an app only after tapping for five times, pressing required for all operations, randomly moving an icon by means of tapping, and tapping an icon until the terminal is unlocked. It should be understood that options of the response manner are flexible and diverse, and are not limited to the options shown in the figure.

Figure 7:
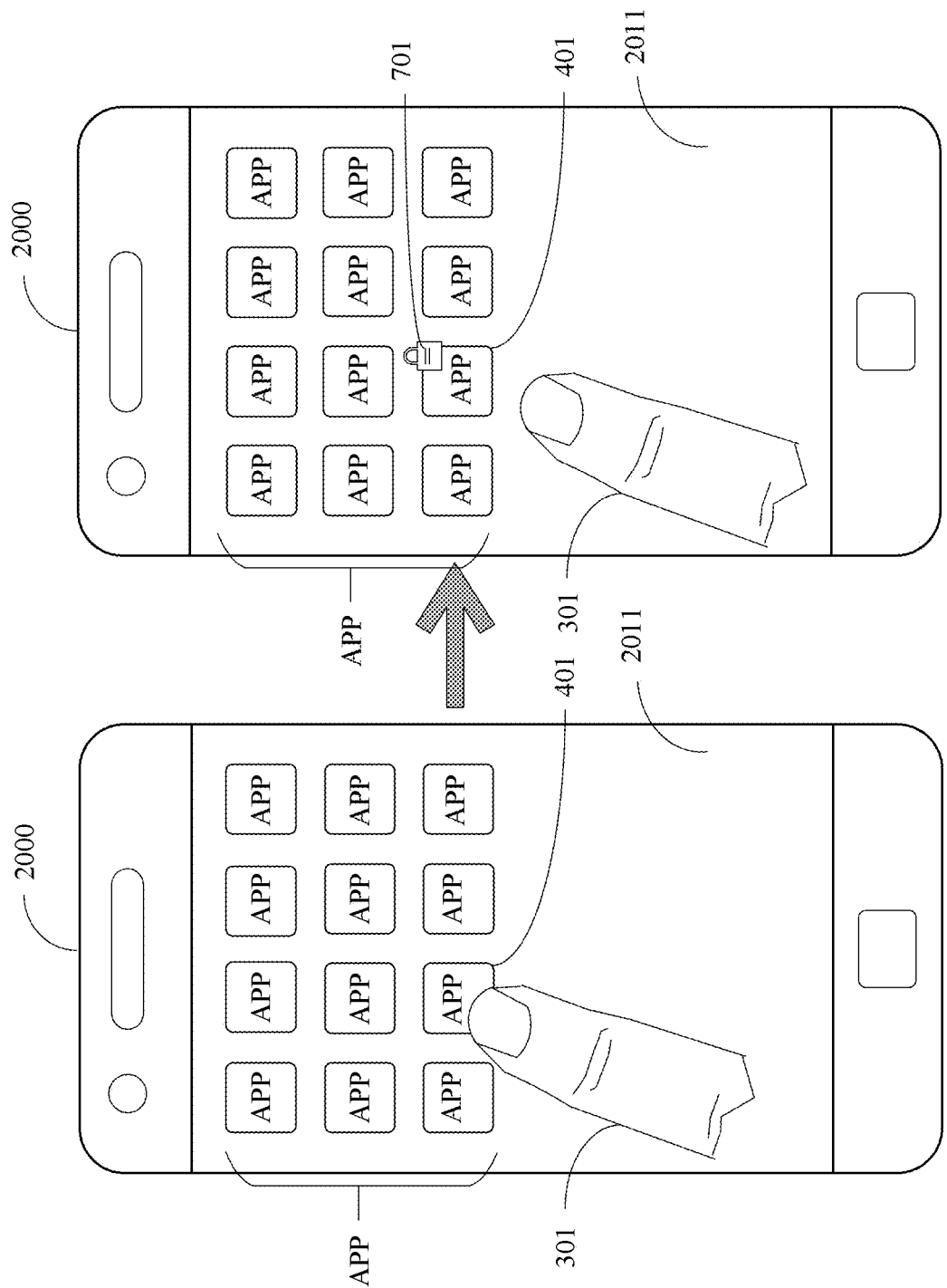
FIG. 7 is a schematic diagram of usage limitation in which a response manner is locking according to an embodiment of the present invention.

Referring to FIG. 7, a mobile terminal 2000 includes a touchscreen 2011, and there are some applications (APP) on a display screen of the mobile terminal 2000. If an app 401 is in a usage limited state, and a response manner enabled by a user is locking an application for a period of time, when a user finger 301 taps an icon of the app 401, the mobile terminal 2000 does not temporarily perform an operation of starting an application, adds a locking mark 701 on the icon of the app 401, to indicate that an additional response manner for usage limitation is locking the app 401 for a period of time, and terminates execution of the additional response manner after a usage limitation condition is not met.

Figure 8:
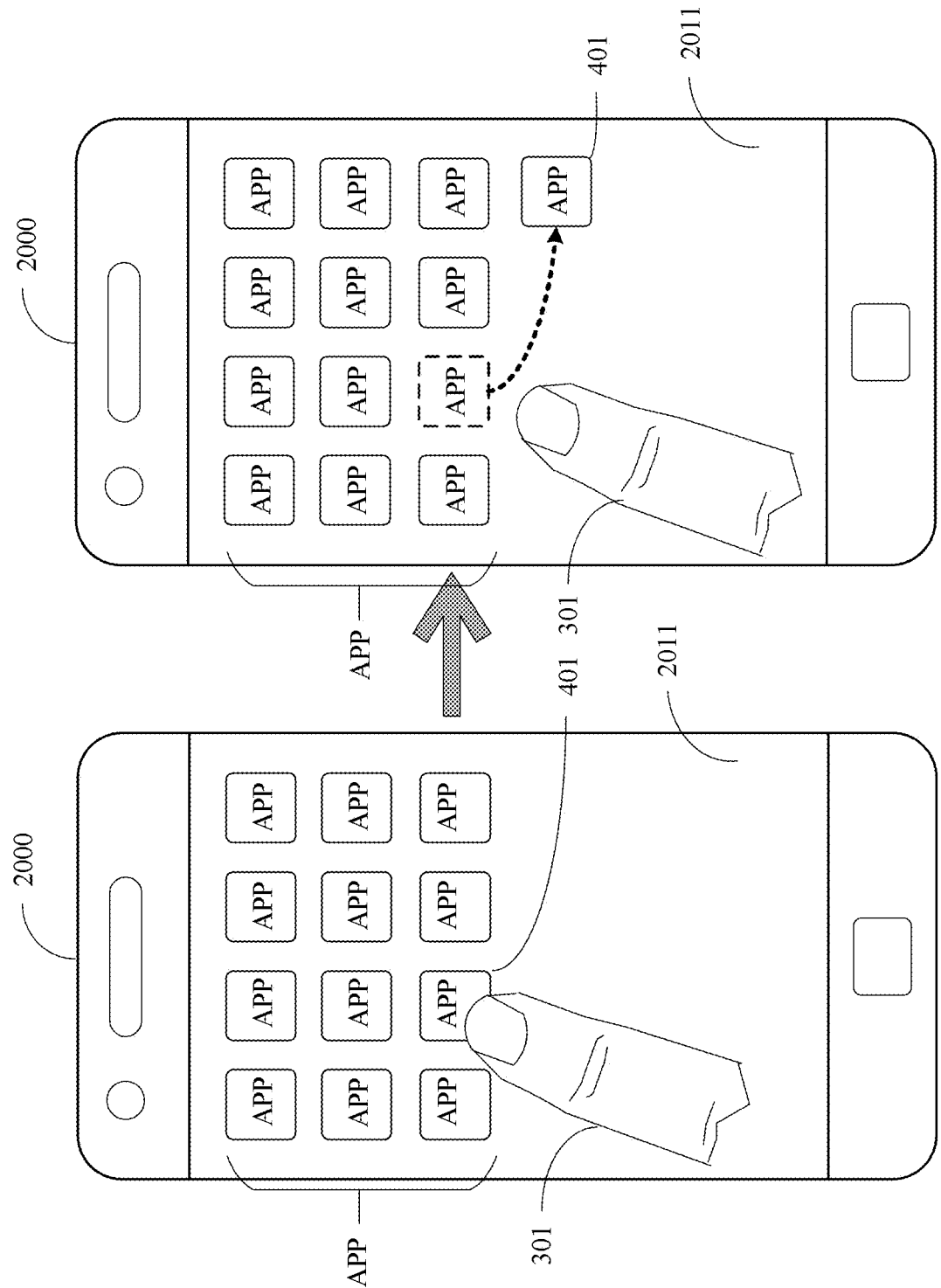
FIG. 8 is a schematic diagram of usage limitation in which a response manner is moving a location of an icon according to an embodiment of the present invention.

Referring to FIG. 8, a mobile terminal 2000 includes a touchscreen 2011, and there are some applications (APP) on a display screen of the mobile terminal 2000. If an app 401 is in a usage limited state, and a response manner enabled by a user is moving a location of an icon of an application, when a user finger 301 taps an icon of the app 401, the mobile terminal 2000 does not temporarily perform an operation of starting an application, and moves the icon of the app 401 to a specific location. A moving path may indicate a change of display coordinates of the icon, and a change rule may be random or may be preset. A location of the icon of the app 401 shown in the figure moves from a third row and a second column to a fourth row and a fourth column. If it is detected, after icon movement, that the user taps a new display location of the icon of the app 401, the icon may be further moved to limit starting of the app 401, and execution of the additional response manner is terminated after the usage limitation condition is not met.

A provided system prompt includes but is not limited to forms such as a text, a picture, a voice, and a video, and may be specifically implemented by using hardware such as a display and a loudspeaker. Any proper form may be used for the prompt. In addition to a visual notification on the display, the prompt may include an audio form (for example, an alert tone and a ringtone), an audiovisual form, and/or a physical form (for example, a vibrant reminder and an LED reminder). A person skilled in the art may suppose another type of notification in the scope of the present invention.

Figure 9A:
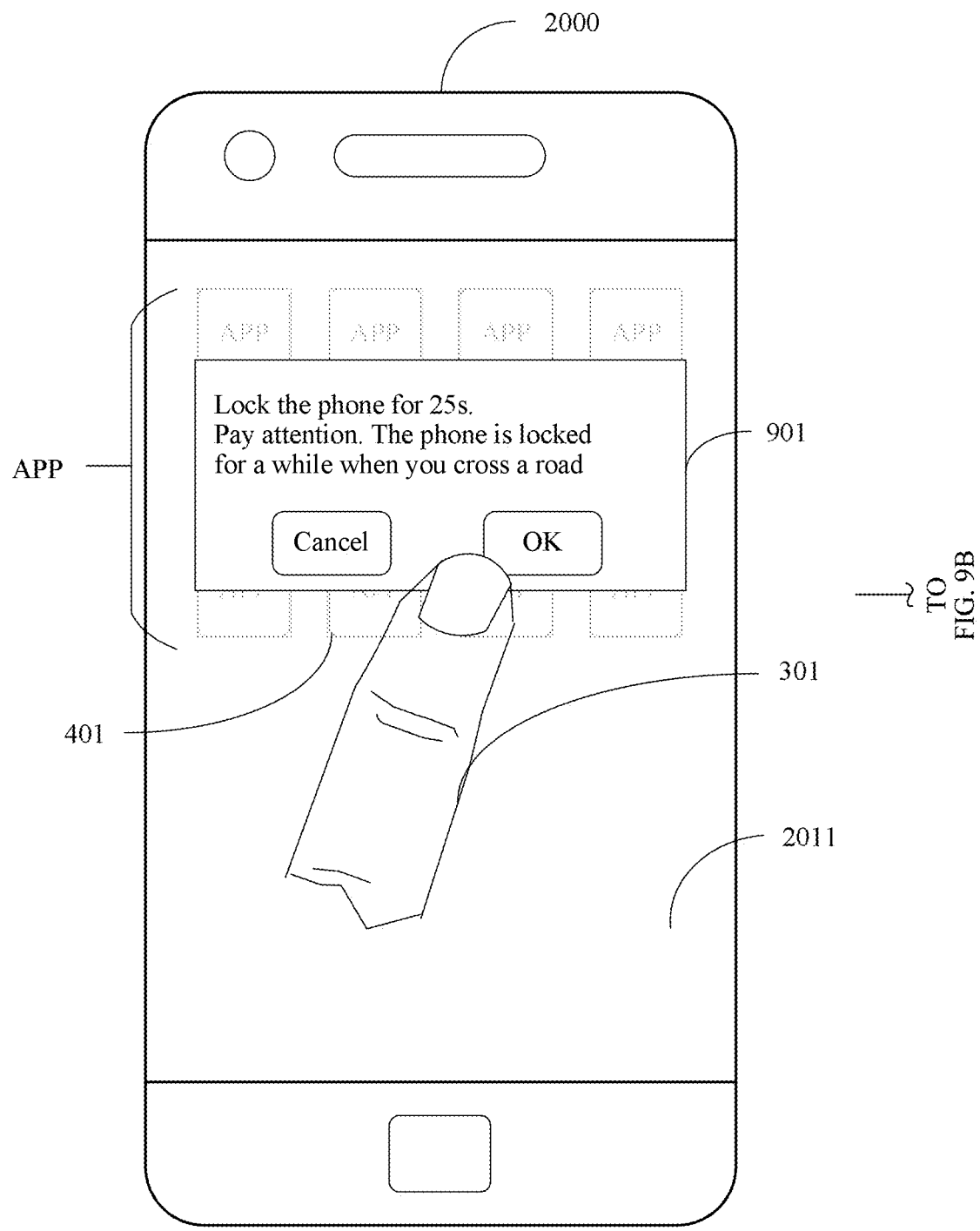
FIG. 9A and FIG. 9B are a schematic diagram of usage limitation in which a response manner is giving a system prompt according to an embodiment of the present invention.
Figure 9B:
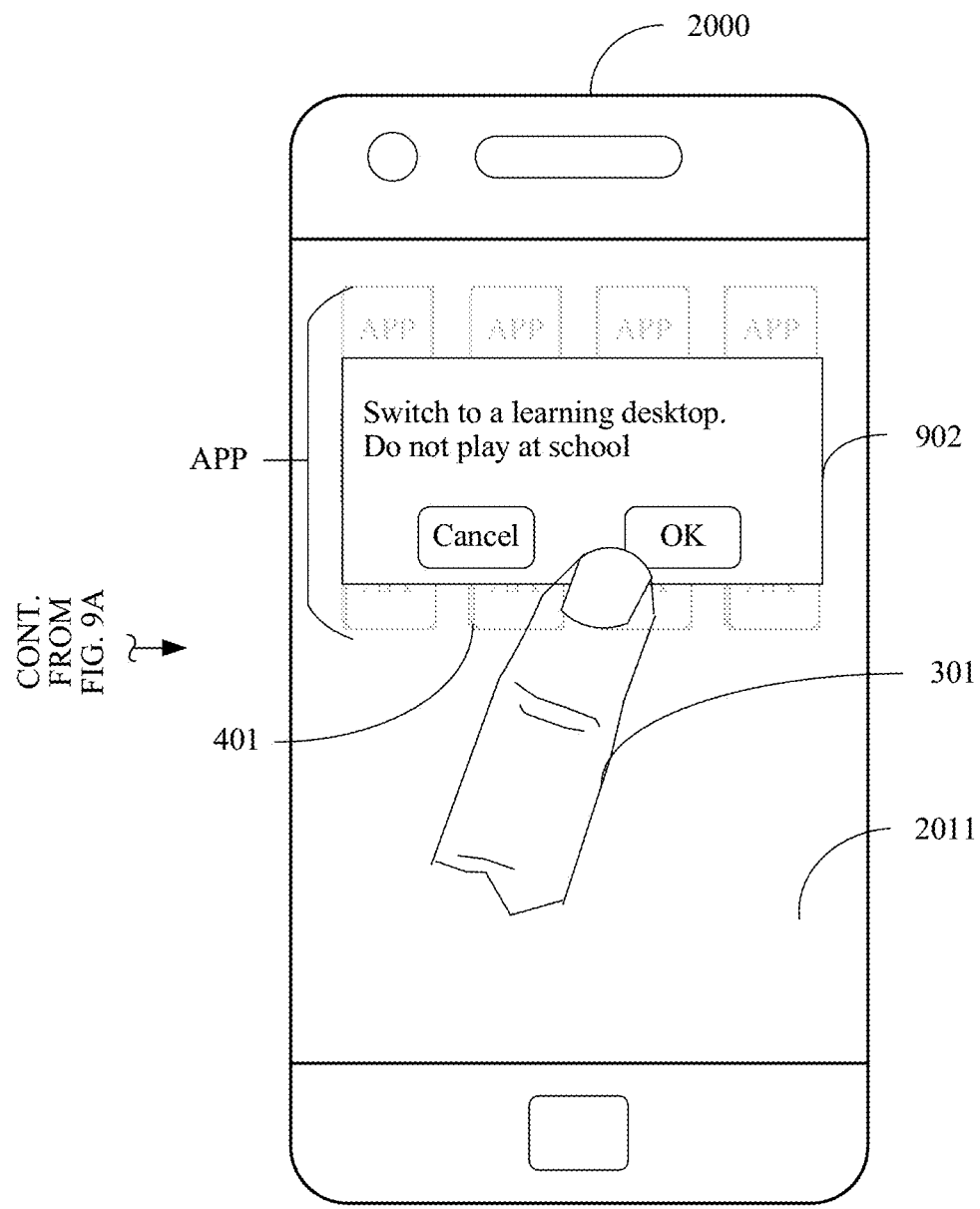

Referring to FIG. 9A and FIG. 9B, a mobile terminal 2000 includes a touchscreen 2011, and there are some applications (APP) on a display screen of the mobile terminal 2000. If an app 401 is in a usage limited state, and a response manner enabled by a user is providing a system prompt, when a user finger 301 taps an icon of the app 401, the mobile terminal 2000 does not temporarily perform an operation of starting an application, and provides a system prompt box 901/902. In a left figure, the mobile terminal 2000 learns, by means of positioning by using a GPS module, that the user is near a road and is moving to the other side of the road, and the app 401 is in a usage limited state in a current operation condition. In this case, when it is detected that the user finger 301 taps the icon of the app 401, the system prompt box 901 is provided to remind the user to concentrate on crossing the road, or an alert tone is given, and an operation of starting the app 401 is not temporarily performed. In a right figure, the mobile terminal 2000 detects that a user identity is a student, a current system time falls within a period of class time, and the app 401 is in the usage limited state in this condition. In this case, when it is detected that the user finger 301 taps the icon of the app 401, the system prompt box 902 is provided to remind the user to concentrate on study, and an operation of starting the app 401 is not temporarily performed.

Optionally, when usage of an application is limited, an icon of the application may be different from an icon in a normal display state, for example, the icon deforms (for example, an icon contour shape changes, another contour is added, a contour line becomes thick, a contour line becomes a dashed line, or a contour line disappears), the icon discolors (for example, the icon becomes gray or dimmer, or changes to another color, or a contour line changes to another color), a limitation mark is added (for example, a locking mark or a limitation figure stamp is added), the icon disappears (for example, the icon is temporarily hidden), or the icon is moved to a specific location (for example, the icon is moved to a dedicated usage limitation icon folder). After a usage limitation condition is removed, that is, the usage limitation condition is not met, the icon of the application is restored to the normal display state.

Figure 10:
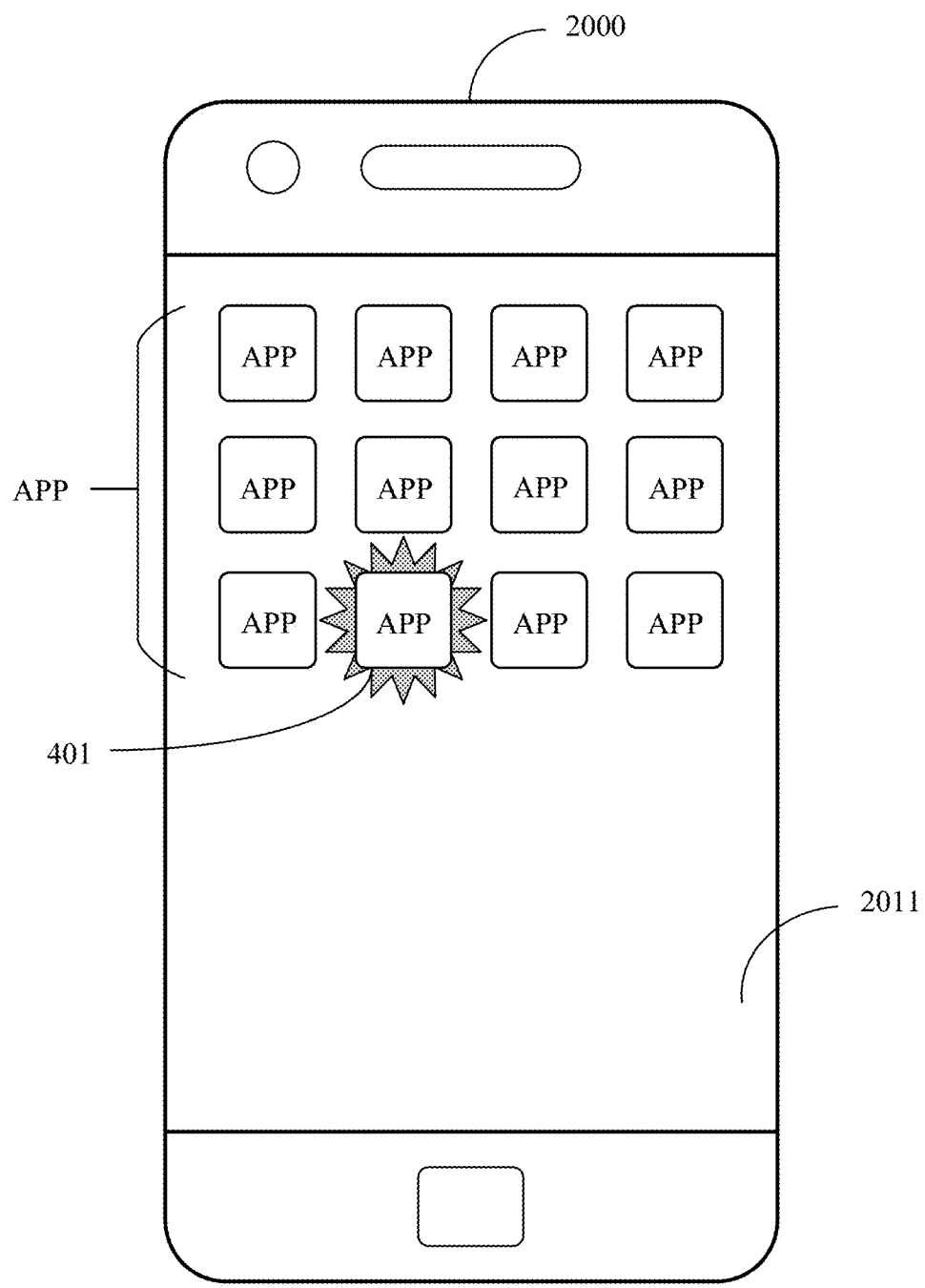
FIG. 10 is a schematic diagram of an icon display manner during usage limitation according to an embodiment of the present invention.

Referring to FIG. 10, a mobile terminal 2000 includes a touchscreen 2011, and there are some applications (APP) on a display screen of the mobile terminal 2000. If an app 401 is in a usage limited state, an icon of the app 401 may be different from an icon in a normal display state. A deformation effect is added to the icon of the app 401 in the figure, to indicate that the app 401 is in the usage limited state in a current condition.

Figure 11:
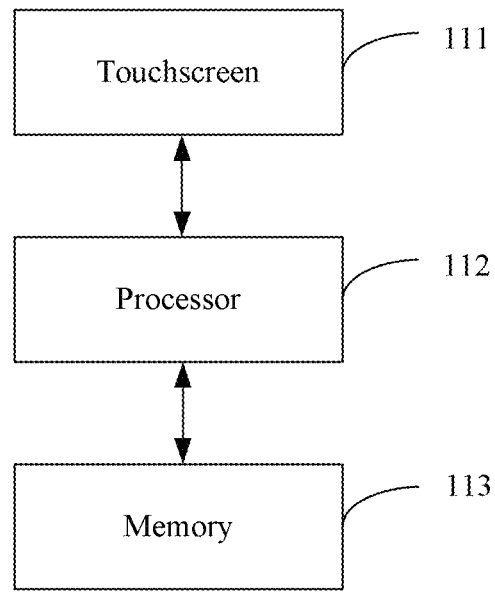
FIG. 11 is a schematic diagram of a mobile terminal according to an embodiment of the present invention.

In addition, referring to FIG. 11, an embodiment of the present invention provides a terminal, including a touchscreen 111, one or more processors 112, a memory 113, a plurality of applications, and one or more programs. The one or more programs are stored in the memory and are configured to be executed by the one or more processors. The one or more programs include an instruction. The instruction is used to perform the following operations: presetting a usage limitation condition for the application, where the usage limitation condition includes a time, a geographical location, a network condition, and a user attribute of the mobile terminal; when an input operation of a user is received, obtaining a current operation environment corresponding to the usage limitation condition; and limiting usage of the application when the operation environment meets the usage limitation condition; or normally using the application when the operation environment does not meet the usage limitation condition. A specific method is the same as the foregoing method for limiting usage of an application.

Optionally, the terminal may further include one or more of the following components: a GPS module, an RF circuit, a WiFi module, a loudspeaker, a microphone, a sensor, a power supply, a camera, or a Bluetooth module.

Figure 12:
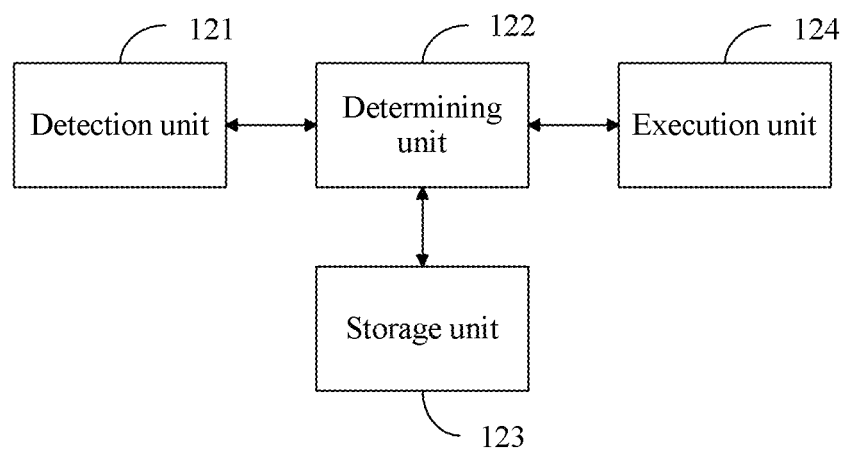
FIG. 12 is a schematic diagram of another mobile terminal according to an embodiment of the present invention.

In addition, referring to FIG. 12, another embodiment of the present invention provides a terminal, including a detection unit 121, a determining unit 122, a storage unit 123, and an execution unit 124. The storage unit 123 is configured to store a preset usage limitation condition. After receiving an input operation of a user, the detection unit 121 sends a current user operation environment condition to the determining unit 122. The determining unit 122 compares the received user operation environment condition with the preset usage limitation condition stored in the storage unit 123. When the user operation environment condition meets the preset usage limitation condition, the determining unit 122 sends an execution instruction for limiting usage to the execution unit 124, and the execution unit 124 limits usage of an application according to the execution instruction received from the determining unit 122. When the user operation condition does not meet the preset usage limitation condition, the determining unit 122 sends an execution instruction for not limiting usage to the execution unit 124, and the execution unit 124 does not limit usage of the application.

In addition, an embodiment of the present invention provides a storage medium, configured to store a computer software instruction, and the instruction is used to perform the following operations: presetting a usage limitation condition for the application, where the usage limitation condition includes a time, a geographical location, a network condition, and a user attribute of the mobile terminal; when an input operation of a user is received, obtaining a current operation environment corresponding to the usage limitation condition; and limiting usage of the application when the operation environment meets the usage limitation condition; or normally using the application when the operation environment does not meet the usage limitation condition. A specific method is the same as the foregoing method for limiting usage of an application on a mobile terminal.

It should be understood that, the term "and/or" used in this specification indicates and includes any or all possible combinations of one or more items in associated listed items. It should be further understood that the term "include" and/or "contain" used in this specification specifies presence of features, integers, steps, operations, elements, and/or components, with presence or addition of one or more other features, integers, steps, operations, elements, components, and/or their combinations not excluded.

It should be understood that although the terms such as "first" and "second" may be used to describe various elements in this specification, the elements should not be limited by the terms. The terms are merely used to distinguish one element from another element. For example, first contact may be named second contact, and similarly, second contact may be named first contact, without departing from the scope of the present invention. Both the first contact and the second contact are contact, but the first contact and the second contact may not be same contact; in some scenarios, the first contact and the second contact may be same contact.

The terms used in the description of the present invention in this specification are merely for the purpose of describing specific embodiments, and are not intended to limit the present invention. The terms "one", "a" and "this" of singular forms used in this specification and the appended claims of the present invention are also intended to include plural forms, unless otherwise specified in the context clearly.

According to the context, the term "if" used in this specification may be interpreted as a meaning of "when" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

A person of ordinary skill in the art may be aware that, in combination with the examples described in the embodiments disclosed in this specification, units, algorithms, and method steps may be implemented by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention. The unit division is merely logical function division and may be other division in actual implementation. The displayed or discussed mutual couplings or direct couplings or communication connections may be implemented by using some interfaces. The indirect couplings or communication connections between the apparatuses or units may be implemented in electronic, mechanical, or other forms. In addition, functional units in the embodiments of the present invention may be integrated into one processing unit, or each of the units may exist alone physically, or two or more units are integrated into one unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementations of the present invention, but are not intended to limit the protection scope of the present invention. Any equivalent variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal comprising:
a display screen;
a memory comprising instructions; and
a processor coupled to the display screen and the memory and configured to execute the instructions to:
set, in a first interface, a first condition to a first application, wherein the first condition relates to time, and wherein the first interface is a configuration interface for configuring different conditions to multiple applications;
set, in the first interface, a second condition to a second application, wherein the second condition relates to time;
restrict use of the first application when the first condition is not satisfied;
restrict use of the second application when the second condition is not satisfied;
receive, in a second interface, a user operation for removing the first condition to the first application, wherein the second interface is different from the first interface;
in response to the user operation, remove the first condition to the first application and display an application interface of the first application; and
keep the second condition to the second application.

2. The terminal of claim 1, wherein the processor is further configured to execute the instructions to display a graphical limitation mark proximate to an application icon of the second application on the display screen until a given time period has passed, and wherein the graphical limitation mark indicates that use of the second application is restricted.

3. The terminal of claim 2, wherein the graphical limitation mark and the application icon of the second application are displayed on a home screen.

4. The terminal of claim 1, wherein the processor is further configured to execute the instructions to change an appearance of an application icon of the first application when the first application is restricted.

5. The terminal of claim 1, wherein the processor is further configured to execute the instructions to gray out an application icon of the first application when the first application is restricted.

6. The terminal of claim 1, wherein the processor is further configured to execute the instructions to restrict use by prohibiting a message notification of the first application or the second application from popping up on the display screen.

7. The terminal of claim 1, wherein the first application and the second application belong to a same application type.

8. A method for limiting usage of an application, implemented by a mobile terminal, and comprising:
setting, in a first interface, a first condition to a first application, wherein the first condition relates to time, and wherein the first interface is a configuration interface for configuring different conditions to multiple applications;
setting, in the first interface, a second condition to a second application, wherein the second condition relates to time;
restricting use of the first application when the first condition is not satisfied;
restricting use of the second application when the second condition is not satisfied;
receiving, in a second interface, a user operation for removing the first condition to the first application, wherein the second interface is different from the first interface;
in response to the user operation, removing the first condition to the first application and displaying an application interface of the first application; and
keeping the second condition to the second application.

9. The method of claim 8, further comprising graying out an application icon of the first application when usage of the first application is restricted.

10. The method of claim 8, further comprising prohibiting a message notification of the first application from popping up on a display screen of the mobile terminal when usage of the first application is restricted.

11. The method of claim 8, further comprising receiving a user input to remove the second condition to the second application.

12. The method of claim 8, further comprising:
displaying a graphical limitation mark proximate to an application icon of the first application when use of the first application is restricted; and
ceasing to display the graphical limitation mark after the first condition of the first application is removed.

13. The method of claim 12, wherein the graphical limitation mark and the application icon of the first application are displayed on a home screen.

14. A computer program product comprising instructions stored on a non-transitory computer readable storage medium that, when executed by a processor, cause a computer to:
set, in a first interface, a first condition to a first application, wherein the first condition relates to time, and wherein the first interface is a configuration interface for configuring different conditions to multiple applications;
set, in the first interface, a second condition to a second application, wherein the second condition relates to time;
restrict use of the first application when the first condition is not satisfied;
restrict use of the second application when the second condition is not satisfied;
receive, in a second interface, a user operation for removing the first condition to the first application, wherein the second interface is different from the first interface;
in response to the user operation, remove the first condition to the first application and display an application interface of the first application; and
keep the second condition to the second application.

15. The computer program product of claim 14, wherein the processor is further configured to execute the instructions to cause the computer to:
display a graphical limitation mark proximate an application icon of the first application when use of the first application is restricted; and
cease displaying the graphical limitation mark after the first condition of the first application is removed.

16. The computer program product of claim 14, wherein the processor is further configured to execute the instructions to cause the computer to display a graphical limitation mark proximate to an application icon of the second application on a display screen until a given time period has passed, and wherein the graphical limitation mark indicates that use of the second application is restricted.

17. The computer program product of claim 14, wherein the processor is further configured to execute the instructions to cause the computer to change an appearance of an application icon of the first application when the first application is restricted.

18. The computer program product of claim 14, wherein the processor is further configured to execute the instructions to cause the computer to gray out an application icon of the first application when the first application is restricted.

19. The computer program product of claim 14, wherein the processor is further configured to execute the instructions to cause the computer to restrict use by prohibiting a message notification of the first application or the second application from popping up on a display screen.

20. The computer program product of claim 14, wherein the first application and the second application belong to a same application type.

* * * * *